US010710867B2

(12) United States Patent
Cajiga et al.

(10) Patent No.: US 10,710,867 B2
(45) Date of Patent: Jul. 14, 2020

(54) FUEL DISTRIBUTION STATION

(71) Applicants: Jose A. Cajiga, Miami, FL (US); Arturo Cajiga Villar, Miami, FL (US); Vicente Cajiga Villar, Miami, FL (US); Alexandra Cajiga, Miami, FL (US)

(72) Inventors: Jose A. Cajiga, Miami, FL (US); Arturo Cajiga Villar, Miami, FL (US); Vicente Cajiga Villar, Miami, FL (US); Alexandra Cajiga, Miami, FL (US)

(73) Assignee: CAPAT, LLC, Miami, FL (US)

( * ) Notice: Subject to any disclaimer, the term of this patent is extended or adjusted under 35 U.S.C. 154(b) by 120 days.

(21) Appl. No.: 15/427,353

(22) Filed: Feb. 8, 2017

(65) Prior Publication Data

US 2017/0225938 A1 Aug. 10, 2017

Related U.S. Application Data

(60) Provisional application No. 62/292,978, filed on Feb. 9, 2016.

(51) Int. Cl.
 B67D 7/04 (2010.01)
 B67D 7/08 (2010.01)
 (Continued)

(52) U.S. Cl.
 CPC .................. B67D 7/08 (2013.01); B60S 5/02 (2013.01); B67D 7/04 (2013.01); B67D 7/40 (2013.01);
 (Continued)

(58) Field of Classification Search
 CPC ... B67D 7/08; B67D 7/78; B67D 7/40; B67D 7/04; F17C 5/007; F17C 5/00; F17C 13/12; F17C 2205/013; F17C 2205/0111; F17C 2221/033; F17C 2221/035; F17C 2221/012; F17C 2223/036; F17C 2223/0153;
 (Continued)

(56) References Cited

U.S. PATENT DOCUMENTS 2,021,544 A 11/1935 Crown
3,883,042 A 5/1975 Junker
(Continued)

FOREIGN PATENT DOCUMENTS

DE 20213688 11/2002
JP 53-7822 1/1978
(Continued)

OTHER PUBLICATIONS

International Search Report dated May 23, 2017 Based on International Application No. PCT/US2017/016911.
(Continued)

*Primary Examiner* — Nicolas A Arnett
(74) *Attorney, Agent, or Firm* — Grogan, Tuccillo & Vanderleeden, LLP

(57) ABSTRACT

An environmentally friendly fuel distribution station includes an upper canopy, said upper canopy including a fuel tank and an outer shell enclosing said fuel tank, and a fuel distribution interface suspended from said upper canopy, said fuel distribution interface selectively distributing fuel from said fuel tank during a fueling operation.

12 Claims, 4 Drawing Sheets

(51) Int. Cl.
  *B60S 5/02* (2006.01)
  *F17C 5/00* (2006.01)
  *F17C 13/12* (2006.01)
  *B67D 7/40* (2010.01)
  *B67D 7/78* (2010.01)

(52) U.S. Cl.
  CPC .............. *B67D 7/78* (2013.01); *F17C 5/00* (2013.01); *F17C 5/007* (2013.01); *F17C 13/12* (2013.01); *F17C 2205/013* (2013.01); *F17C 2205/0111* (2013.01); *F17C 2205/0134* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2260/042* (2013.01); *F17C 2270/0139* (2013.01)

(58) Field of Classification Search
  CPC ........ F17C 2223/033; F17C 2223/0123; F17C 2225/0134; F17C 2260/042; F17C 2270/0139; B60S 5/02
  See application file for complete search history.

(56) References Cited

U.S. PATENT DOCUMENTS

| | | | |
|---|---|---|---|
| 4,627,552 A | 12/1986 | Yoshida et al. | |
| 4,901,748 A | 2/1990 | Shotmeyer | |
| 4,986,446 A | 1/1991 | Montgomery et al. | |
| 5,251,473 A | 10/1993 | Reese | |
| 5,564,588 A * | 10/1996 | Reese .................. | B60S 5/02 220/565 |
| 5,954,102 A | 9/1999 | Sato et al. | |
| 6,230,939 B1 * | 5/2001 | Willeke .................. | B60S 5/02 137/234.6 |
| 6,237,647 B1 | 5/2001 | Pong et al. | |
| 7,296,601 B2 * | 11/2007 | Webb .................. | B60S 5/02 141/311 A |
| 8,176,931 B1 * | 5/2012 | Cajiga .................. | B60S 5/02 137/234.6 |
| 8,403,071 B1 * | 3/2013 | Webb .................. | A62C 3/06 141/18 |
| 8,573,242 B2 * | 11/2013 | Cajiga .................. | B60S 5/02 137/15.01 |
| 8,667,690 B2 * | 3/2014 | Cajiga .................. | B60S 5/02 29/897.3 |
| 8,959,774 B2 * | 2/2015 | Cajiga .................. | B60S 5/02 29/897.3 |
| 9,181,078 B2 | 11/2015 | Cajiga et al. | |
| 2010/0023162 A1 | 1/2010 | Gresak et al. | |
| 2018/0100622 A1 * | 4/2018 | Cajiga .................. | F17C 13/004 |
| 2019/0071301 A1 * | 3/2019 | Cajiga .................. | B67D 7/32 |

FOREIGN PATENT DOCUMENTS

| | | |
|---|---|---|
| JP | 61-50855 | 3/1986 |
| JP | 10-167397 | 6/1998 |
| JP | 2004-148882 | 5/2004 |
| JP | 2006-38007 | 2/2006 |
| JP | 2014-524865 | 9/2014 |
| JP | 2014524865 | 9/2014 |
| JP | 2014-527128 | 10/2014 |
| KR | 10-1998-0063641 | 10/1998 |
| WO | 2012177451 | 12/2012 |

OTHER PUBLICATIONS

Australian Examination Report dated Feb. 15, 2019 issued in the corresponding Australian Patent Application No. 2017217389.
Korean Office Action dated Aug. 20, 2019 issued in corresponding KR Application No. 10-2018-7025812.
Russian Office Action dated Apr. 23, 2019 issued in the corresponding Russian Patent Application No. 2018131707.
Japanese Office Action dated Jul. 23, 2019 issued in the corresponding Japanese Patent Application No. 2018-543093.
Supplementary Partial European Search Report dated Sep. 30, 2019 issued in corresponding EP Application No. 17750656.5.

* cited by examiner

FUEL DISTRIBUTION STATION

CROSS-REFERENCE TO RELATED APPLICATIONS

This application claims the benefit of U.S. Provisional Application Ser. No. 62/292,978, filed on Feb. 9, 2016, which is hereby incorporated by reference herein in its entirety.

FIELD OF THE INVENTION

The present invention relates generally to a fuel distribution station and, more particularly, to a fuel distribution station which is environmentally friendly, safe to operate, and convenient to maintain.

BACKGROUND OF THE INVENTION

Fuel distribution stations are heavily demanded globally, as more and more automobiles are put into service on roads to meet the transportation demands of an ever-expanding population. The construction and operation of conventional fuel distribution and service stations, however, are lengthy, costly and resource-consuming undertakings. Surveys and studies of anticipated demand must be commissioned, the station must be designed in a configuration sufficient to meet the anticipated demand, permits must be pulled, and a lengthy construction process must be commenced and completed before a single gallon of gasoline may be pumped.

Notwithstanding resource-consuming undertakings for their construction and operation, conventional fuel distribution stations have numerous drawbacks with respect to environmental, safety, and maintenance concerns.

First, fuel distribution stations are classified as objects of a potentially high environmental impact. For example, automotive fuels are typically stored in underground tanks from which the fuel is pumped to a fuel dispenser before transfer into an automobile. These tanks are typically constructed of metal or fiberglass. Underground installation of these tanks requires relatively extensive excavation and coverage, thereby creating many potential problems. One known problem associated with underground fuel tanks is leakage or seepage into the surrounding soil. This is particularly true of metallic tanks, which can corrode or degrade over time, especially in moist soil. Seepage into the surrounding soil results both in the steady loss of fuel and environmental (soil and water) pollution. Moreover, in case of flooding, the tanks installed underground are inefficient and the fuel in them may be contaminated with water and with sediments within the water.

Moreover, fuel tanks are typically buried underground beneath the structure of the station with a thick concrete disposal block on top of the tank, making it difficult to perform maintenance work on the fuel tanks, when required. Once a fuel tank is found to be in need of repair or replacement, the cost of repairing and replacing the underground fuel tank can be extremely expensive.

Another drawback associated with the conventional fuel distribution station is the limitation of the traffic pattern within the fuel distribution station. In a conventional fuel station, the pumping equipment connected to the underground fuel tanks is built directly from the ground. Although protective bumps and barriers are often built surrounding the pumping equipment, every year serious damage results due to the accidental crashing of vehicles into the pumping equipment. In order to prevent such accidents within the fuel station, the traffic pattern in the fuel stations has to be limited, and therefore it is sometimes inconvenient for the vehicles to enter and exit the fuel station for fueling.

In addition to the above, the use of alternative energy sources is starting to become more prevalent in fuel markets. Indeed, the use and demand of alternative energy fuel for transportation is increasing at a rapid pace, and the types of fuel demanded and the consumption rates thereof can be expected to increase drastically from what has been seen to date. Accordingly, new generations of fuel distribution stations must be flexible in terms of their size and the types of fuel that they can store and dispense in response to dynamically changing markets. There is a need for fuel distribution stations that are able to distribute different types of fuel, such as gasoline, diesel, natural gas, hydrogen, and methanol, as well as electricity to quickly charge electric cars. However, underground tanks in the conventional fuel stations are not designed to store different types of fuel, and other facilities are needed to store equipment and to perform processes needed to produce certain types of fuel and energy to deliver to automobiles.

In view of the above-described drawbacks of known fueling stations, there is a need for a fueling station that is more environmentally friendly, operationally safe and convenient to maintain, and which is capable of storing and dispensing different types of fuel.

With the foregoing problems and concerns in mind, it is the general object of the present invention to provide a fuel distribution station which is more environmentally friendly, safe to operate, and convenient to maintain than existing stations.

SUMMARY OF THE INVENTION

With the foregoing concerns and needs in mind, it is the general object of the present invention to provide a mobile fuel distribution station.

It is another object of the present invention to provide a fuel distribution station that is environmentally friendly.

It is another object of the present invention to provide a fuel distribution station that minimizes the risk of contaminating the soil and underground water in the areas surrounding the fuel distribution station.

It is another object of the present invention to provide a fuel distribution station that is less costly to construct and maintain than existing stations.

It is another object of the present invention to provide a fuel distribution station that utilizes the force of gravity to dispense fuel.

It is another object of the present invention to provide a fuel distribution station that uses a minimum number of pipes and wiring.

It is another object of the present invention to provide a fuel distribution station that enables maintenance and repair work to be more conveniently carried out.

It is another object of the present invention to provide a fuel distribution station that provides for the free-flow of traffic.

It is another object of the present invention to provide a fuel distribution station that enables automobiles easily to ingress and egress therefrom.

It is another object of the present invention to provide a fuel distribution station that obviates the risk of automobiles crashing into pumping equipment of the station.

It is another object of the present invention to provide a fuel distribution station that shelters the staff from the weather while maintenance and other operations are performed on the pumping equipment.

It is another object of the present invention to provide a fuel distribution station that has storage tanks capable of storing various types of fuel such as gasoline, diesel, CNG (compressed natural gas), LPG (liquefied petroleum gas), hydrogen and methanol.

It is another object of the present invention to provide a fuel distribution station that can supply various types of fuel such as gasoline, diesel, biodiesel, hydrogen, methanol, CNG, LPG and electric power.

It is another object of the present invention to provide a fuel distribution station having container assemblies that can easily be exchanged with other assemblies to replace equipment contained by such assemblies, and to perform maintenance on equipment without having long periods of down time.

These and other objects of the present invention, and their preferred embodiments, shall become clear by consideration of the specification, claims and drawings taken as a whole.

BRIEF DESCRIPTION OF DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
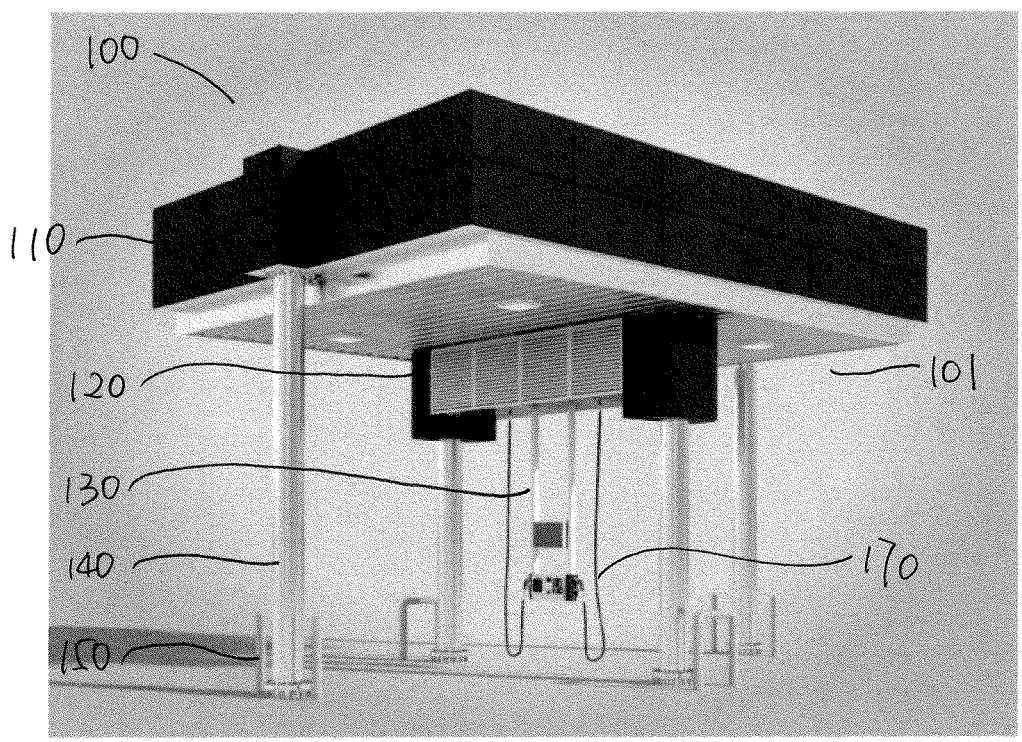
FIG. 1 is an isomeric view of a fuel distribution station in accordance with one embodiment of the present invention.
Figure 2:
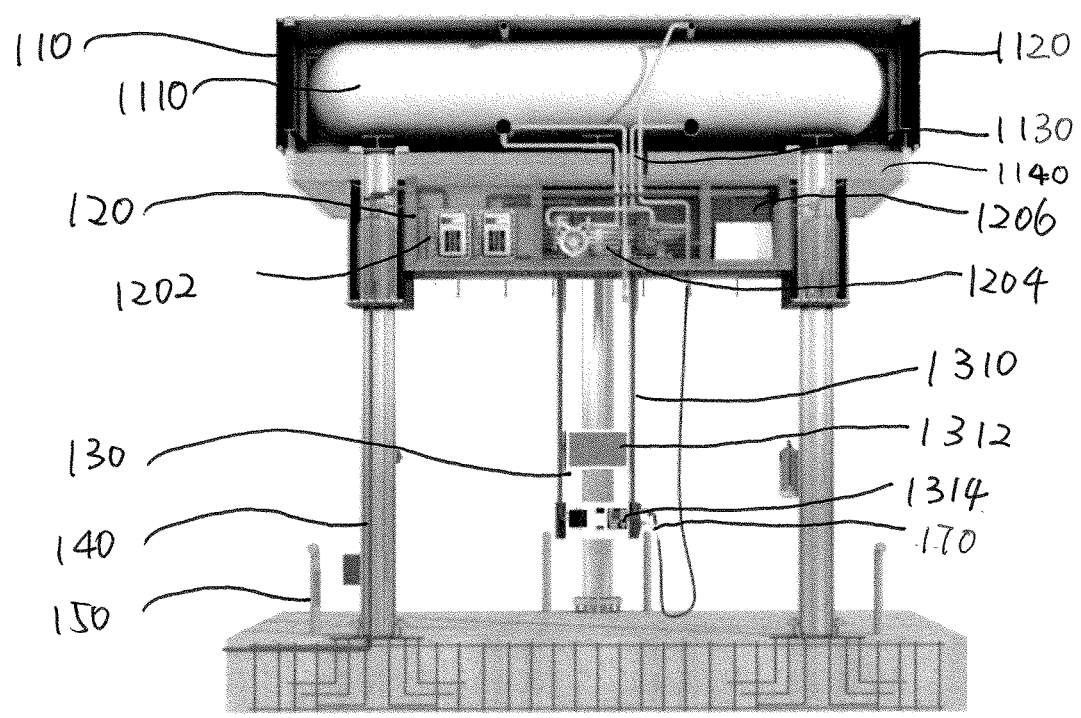
FIG. 2 is a cross-sectional view of the fuel distribution station of FIG. 1.

Referring to FIGS. 1 and 2, a fuel distribution station 100 according to one embodiment of the present invention is shown. With specific reference to FIG. 1, the fuel distribution station 100 includes an upper canopy 101, a fuel distribution interface 130 suspended from the upper canopy 101, a fuel dispenser 170 in close association with the fuel distribution interface, a plurality of supporting structures 140 that support the upper canopy 101 in an elevated position above the ground so as to permit the passage of vehicles beneath the upper canopy 101, and a plurality of protective bumps/columns 150 for the protection of the supporting structures 140. The upper canopy 101 further includes a fuel tank dock 110 where one or more fuel tanks are located, and an equipment bay 120 in close association with the fuel tank dock 110 (e.g. beneath the fuel tank dock 110).

Turning to FIG. 2, the fuel tank dock 110 generally comprises an outer shell 1120, at least one fuel tank 1110 located within the outer shell 1120, and a fire shield wall 1140. The fuel tanks 1110 are in fluid communication with the fuel distribution interface 130 and the equipment bay 120 via fueling pipes 1130. The outer shell 1120 is preferably made of materials that are fireproof and ballistic-proof, such as those known in the art. The fire shield wall 1140 is disposed between the outer shell 1120 of the fuel tank dock 110 and the equipment bay 120, so as to isolate the fuel tanks 1110 and the equipment bay 12 from each other.

As will be readily appreciated, by having the fuel tanks 1110 located in the upper canopy 101 in an elevated position above the ground, the fuel distribution station of the present invention is more environmentally friendly by preventing the fuel tank 1110 and any potential leakage of fuel therefrom from contaminating the soil and underground water in the area surrounding the fuel distribution station, as compared to the conventional fuel stations whose fuel tanks are buried in the ground.

More importantly, it shall be noted that it is easier and cheaper to perform any maintenance work and/or repairs on the fuel tanks 1110 of the present invention compared to conventional fuel stations, as the fuel tanks 1110 of the present invention are located in the upper canopy 101 and are easily accessible, while the fuel tanks in the conventional fuel station are buried underground and a thick block of covering concrete has to be broken in order to gain access to the fuel tanks. In addition, the financial and labor cost for building the fuel distribution station 100 of the present invention is significantly lower than that for building a conventional fuel station, as building of the fuel distribution station 110 does not require significant excavation and underground work.

It should also be noted that electricity consumption by the mechanical pumping equipment in the present invention may be greatly reduced as compared to the conventional fuel station, as the present invention partially utilizes the weight of the fuel to distribute the fuel from the elevated fuel tanks 1110 to the fuel dispenser 170, while the conventional fuel station solely depends on the mechanical pump equipment for pumping the fuel from underground fuel tanks to the fuel dispenser. In particular, by locating the fuel tanks 1110 and the fuel dispenser 170 in the canopy, above vehicles to be refueled, fuel can be dispensed almost entirely or, indeed, entirely, using the force of gravity. This is in contrast to existing fuel stations which require pumps to pump the fuel from the underground tanks, upward to the dispenser, and to a vehicle to be refueled. Accordingly, significant reductions in the amount of electricity utilized can be realized.

As shown in FIG. 2, in one preferred embodiment of the present invention, the equipment bay 120 is located beneath the fuel tank dock 110 and is elevated to a position so as to permit the passage of vehicles beneath the equipment bay when the vehicles enter into the fuel distribution station for fueling. The equipment bay 120 comprises multiple compartments 1202, 1204, 1206, etc. to accommodate different equipment including pumps, filters, and fire suppression systems (e.g., hydraulic and mechanical equipment). This equipment located inside the equipment bay 120 is in fluid communication and electrical communication with the fuel tanks 1110 within the fuel tank dock 110, the fuel dispenser interface 130 and the fuel dispenser 170 suspended from the upper canopy 101.

It should be noted that, by locating the equipment bay 120 separately from and beneath the fuel tanks 1110, and by inserting the fire shield wall 1140 between the equipment bay 120 and the fuel tank dock 110, the present invention effectively prevents sparks from being generated accidentally by the hydraulic and mechanical equipment and inducing fire on the fuel tanks 1110, thereby enhancing the overall safety of the fuel distribution station. In addition, the fuel tank dock 110 is capable of providing shelter to the equipment bay 120 beneath it in different weather conditions.

Referring to FIG. 2, a fuel distribution interface 130 is connected to and suspended from the upper canopy 101 via at least one suspending holder 1310, so as to suspend the fuel distribution interface 130 in an elevated position and in a predetermined distance above the ground. The fuel distribution interface 130 further includes an electronic digital display 1312 to digitally display information to an operator and/user of the fuel distribution station, and an input panel 1314 for the operator and/or user to input information. A fuel dispenser 170 is also suspended from the upper canopy 101 and is disposed in close association with the fuel distribution interface 130.

In an embodiment, the height of the fuel distribution interface 130 is selectively adjustable so as to accommodate the height of the operator and/or user of the fuel distribution station 100, as well as to accommodate the height of the vehicles entering the fuel distribution station 100 for fueling. A sensor can be arranged in association with the fuel distribution station 100 (e.g., with each dispenser) to detect the height of the vehicles entering into the fuel distribution station and to transmit the height data of the vehicles to the fuel distribution interface 130. The fuel distribution interface 130 thereby is capable of adjusting its height automatically based on the height data of the vehicles entering into the fuel distribution station 100.

As disclosed above, the fuel distribution station 100 of the present invention provides a number of distinct advantages over the conventional fueling stations. First, suspending the equipment bay 120 and the fuel distribution interface 130 from the upper canopy 101 reduces the chance of a vehicle crashing into a component or components of the fuel distribution interface 130 as compared to a conventional fuel station where the pumping and fuel distribution unit/kiosks are mounted on the ground.

Moreover, by eliminating the pumping and fuel distribution units/kiosks from ground level, the fuel distribution station 100 of the present invention requires fewer protective bumps/columns and other barriers, as compared to conventional fuel stations in which each pumping and fuel distribution unit/kiosk requires a plurality of barriers for impact protection. Thus, the fuel station of the present invention requires less infrastructure, and is therefore less costly than known counterparts. Moreover, by eliminating ground based fueling kiosks, the present invention provides a more flexible traffic pattern within the footprint of the station. Therefore, a vehicle can enter the fuel distribution station 100 from various directions, and park in various angles and directions, as long as it can be reached by the fuel dispenser 170, and can exit the fuel distribution station in a number of different directions, whereas a vehicle entering a conventional fuel station from the ingress of a lane, can park only in parallel to the pumping and distribution unit for fueling purposes and exit via the lane where it parked.

Figure 3:
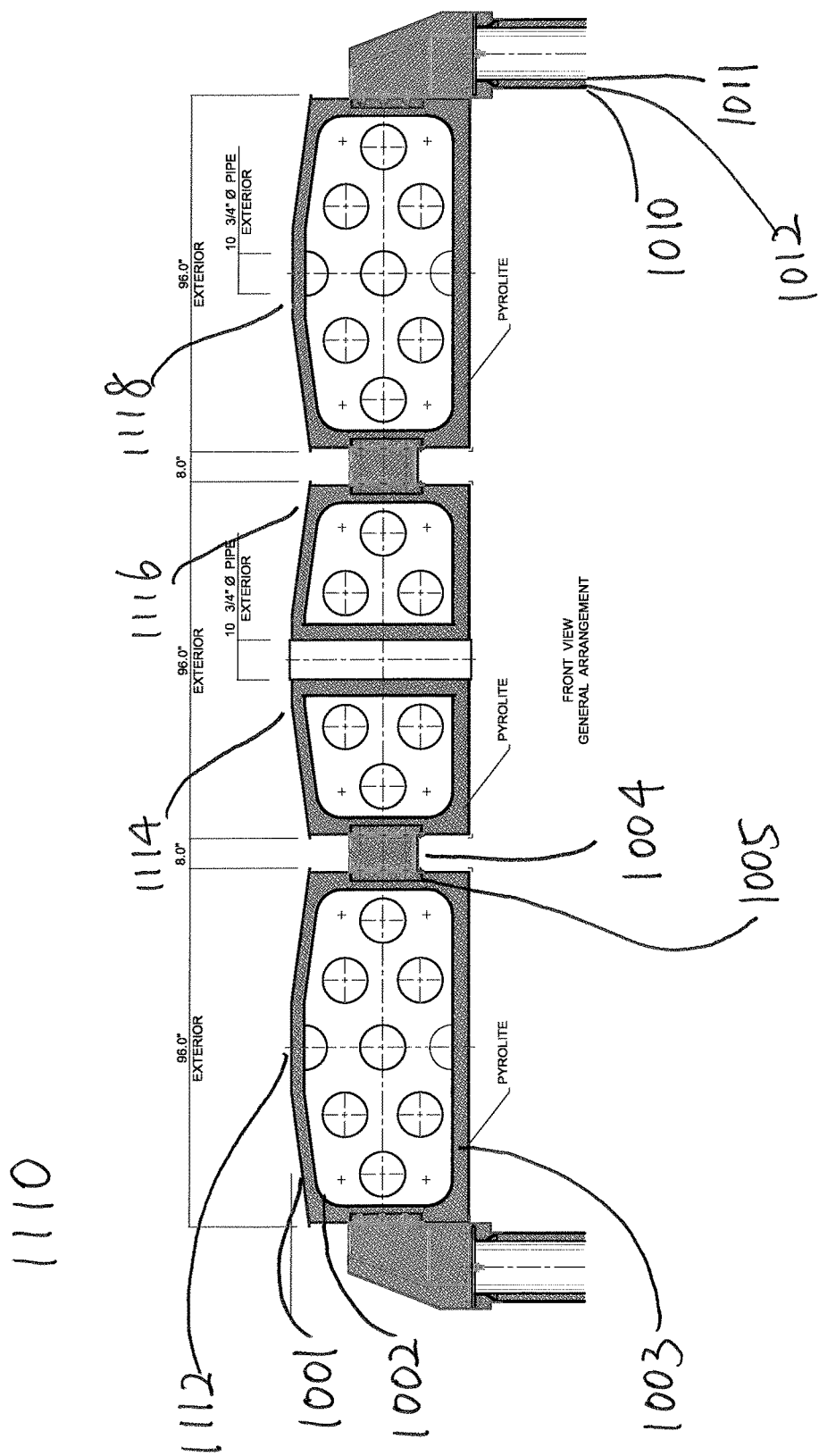
FIG. 3 is a top isomeric view of an equipment bay in accordance with one embodiment of the present invention.

Turning to FIG. 3, the fuel tanks 1110 includes at least one fuel tank. In one preferred embodiment as shown in FIG. 3, the fuel tank 1110 includes a plurality of fuel tank compartments 1112, 1114, 1116, 1118, etc. The fuel tank compartments can be of the same or various shapes and sizes and are connected to adjacent fuel tanks via fuel tank connectors 1004. Each fuel tank compartment can store one type of hydrocarbon-based fuel, and all fuel tank compartment can store the same type of hydrocarbon fuel or various types of hydrocarbon fuels, including but not limited to gasoline, diesel, CNG (compressed natural gas), LPG (liquefied petroleum gas), hydrogen and methanol.

It should be noted that all of the fuel tank compartments 1112, 1114, 1116, 1118 and the fuel tank connectors 1004 have a double wall structure which comprises an outer wall 1001, an inner wall 1002, and fire and ballistic resistant material 1003 such as pyrolite within the space in-between the outer wall 1001 and inner wall 1002. The double wall structure therefore is capable of preventing the fuels inside the fuel tanks from catching on fire for a minimum of two hours during a fire.

Importantly, in addition to the fuel tank compartments 1112, 1114, 1116, 1118, all other wall structures within the fuel distribution station 100, such as the wall structure of the supporting structures 140, the outer shell 1120 of the fuel tank dock 110, the suspending holder 1310, the equipment bay 120, etc. may comprise the aforementioned double wall structure. For example, the wall of the supporting structures 140, as shown in FIG. 3, may comprise an outer wall 1010, an inner wall 1011, and fire and ballistic resistant material 1012 such as pyrolite in-between the outer wall 1010 and inner wall 1011. Therefore, the adoption of the double wall structure enhances the overall fire and ballistic resistance of the fuel distribution station.

With further reference to FIG. 3, the fuel tank connectors 1004 connect the fuel tank compartments 1112, 1114, 1116, 1118, etc. to one another. Although the fuel tank connectors 1004 are partially integrated into the double wall structure of the fuel tank compartments, the outer wall of the fuel tank connectors 1004 does not reach the inner wall 1002 of the fuel tank compartments. The gaps between the outer wall 1005 of the fuel tank connectors 1004 and the inner wall 1002 of the fuel tank compartments provide the fuel tanks 1110 with the ability to release the pressure generated by the thermal expansion and contraction due to the temperature changes over the seasons.

Figure 4:
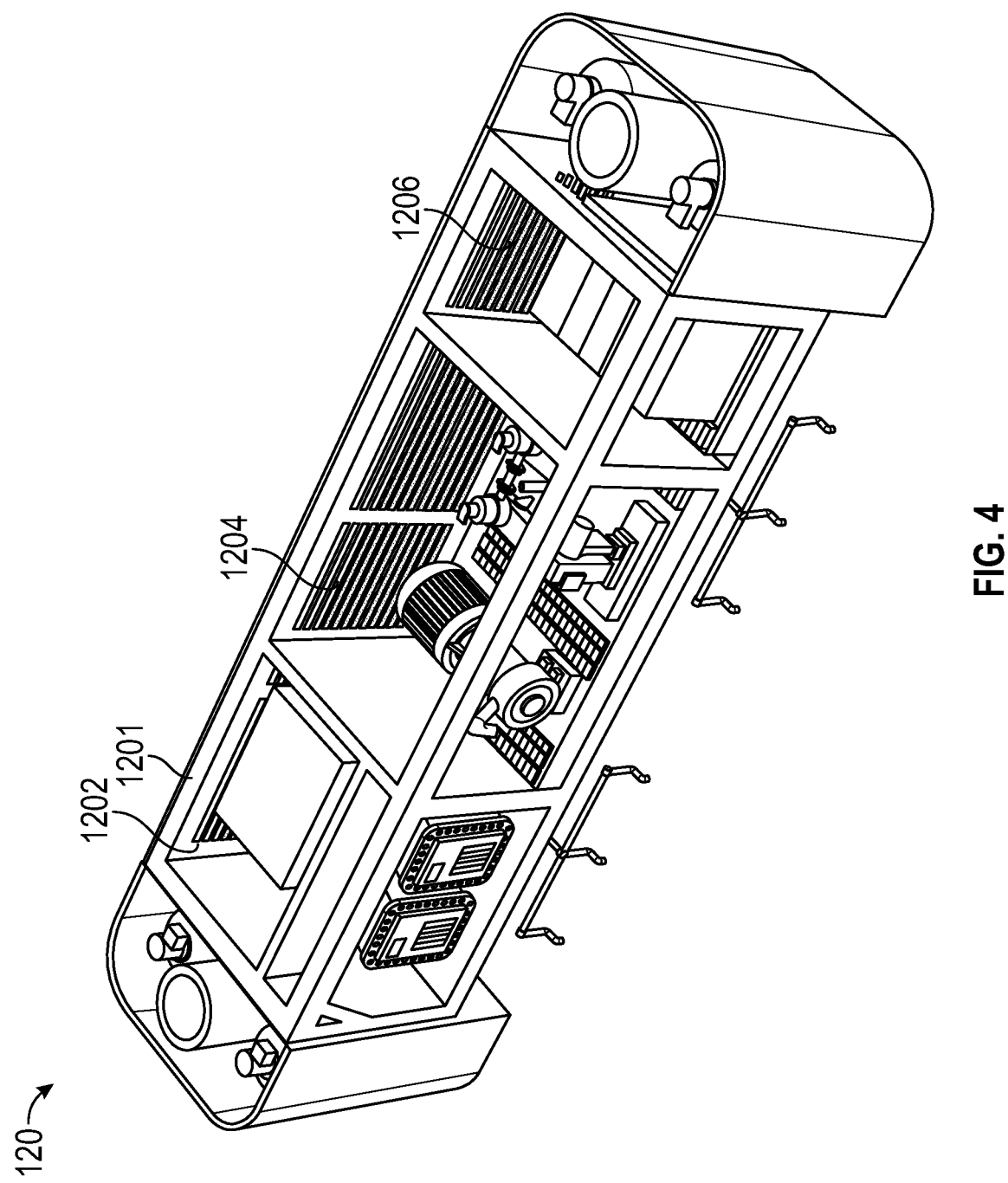
FIG. 4 is an elevational view of fuel tanks with supporting structures partially shown in accordance with one embodiment of the present invention.

Turning now to FIG. 4, the equipment bay 120 comprises an equipment supporting frame 1201 which may further divide the equipment bay 120 into more than one compartment such as compartments 1202, 1204, 1206, etc. Each compartment can be the same or different in terms of shape and size. The compartments may contain equipment including, but not limited to, pumps, filters, and fire suppression systems. It shall be noted that the equipment bay 120 can be modified to accommodate hydrocarbon cracking equipment, so as to refine any known liquid hydrocarbon fuel into LPG.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An environmentally friendly fuel distribution station comprising:
   an upper canopy, said upper canopy including a fuel tank and an outer shell enclosing said fuel tank; and
   a fuel distribution interface suspended from said upper canopy, said fuel distribution interface is configured to receive input information from a user and displays output information to said user, and selectively controls the fuel distribution operation;
   an equipment bay located adjacent to said fuel tank and containing equipment to facilitate a pumping of fuel in said fuel tanks to said fuel distribution interface;
   a fire shield wall disposed between said fuel tank and said equipment bay;

a fuel dispenser structurally independent of said distribution interface and is in close association with said fuel distribution interface,
wherein said fuel dispenser is in fluid communication with said fuel tank for dispensing said fuel from fuel tank.

2. The environmentally friendly fuel distribution station of claim 1, further comprising:
a supporting structure for supporting said upper canopy and said equipment bay in an elevated position permitting the passage of an incoming vehicle beneath said upper canopy and said equipment bay.

3. The environmentally friendly fuel distribution station of claim 1, further comprising:
a fire shield wall disposed between said upper canopy and said equipment bay.

4. The environmentally friendly fuel distribution station of claim 3, wherein:
said upper canopy is disposed above said equipment bay.

5. The environmentally friendly fuel distribution station of claim 1, wherein:
said fuel tank is fire proof and ballistic proof.

6. The environmentally friendly fuel distribution station of claim 1, wherein:
said fuel dispenser is received in a slot locating on said fuel distribution interface.

7. The environmentally friendly fuel distribution station of claim 6, wherein:
said equipment bay includes at least one compartment housing hydraulic and mechanical equipment; and
wherein said hydraulic and mechanical equipment facilitates said fluid communication between said fuel tank and said fuel dispenser.

8. The environmentally friendly fuel distribution station of claim 1, wherein:
said fuel tank includes a first compartment housing a first liquid or gas and a second compartment housing a second liquid or gas;
wherein said first liquid or gas is of a different type than said second liquid or gas.

9. The environmentally friendly fuel distribution station of claim 1, wherein:
said fuel distribution interface includes an electronic display configured to digitally display information to a user of said fuel distribution station, and an input panel for said user to input information.

10. The environmentally friendly fuel distribution station of claim 1, wherein:
a height of said fuel distribution interface is selectively adjustable.

11. The environmentally friendly fuel distribution station of claim 10, further comprising:
at least one sensor configured to detect a height of an incoming vehicle;
wherein said height of said fuel distribution interface is automatically adjusted in dependence upon said height of said incoming vehicle.

12. An environmentally friendly fuel distribution station comprising:
an upper canopy, said upper canopy being supported in an elevated position via a support structure and including a fuel tank and an outer shell enclosing said fuel tank;
a fuel distribution interface suspended from said upper canopy, said fuel distribution interface selectively distributing fuel from said fuel tank during a fueling operation; and
an equipment bay located adjacent to said fuel tank and containing equipment to facilitate a pumping of fuel in said fuel tanks to said fuel distribution interface.

* * * * *